US007480740B1

(12) United States Patent
Saxena et al.

(10) Patent No.: US 7,480,740 B1
(45) Date of Patent: Jan. 20, 2009

(54) METHOD AND SYSTEM FOR ENFORCING HARDWARE/SOFTWARE COMPATIBILITY CONSTRAINTS

(75) Inventors: Ajitabh Prakash Saxena, Norcross, GA (US); Neela Syam Kolli, Lawrenceville, GA (US); Jose Manoj, Duluth, GA (US)

(73) Assignee: LSI Corporation, Milpitas, CA (US)

( * ) Notice: Subject to any disclaimer, the term of this patent is extended or adjusted under 35 U.S.C. 154(b) by 690 days.

(21) Appl. No.: 10/711,783

(22) Filed: Oct. 5, 2004

(51) Int. Cl.
*G06F 3/00* (2006.01)
*G06F 9/00* (2006.01)

(52) U.S. Cl. .............................. 710/8; 713/2; 719/321; 719/327; 710/10

(58) Field of Classification Search ................ 710/8–14
See application file for complete search history.

(56) References Cited

U.S. PATENT DOCUMENTS

| 5,671,367 | A | * | 9/1997 | Le Roux ...................... 710/13 |
| 5,948,076 | A | * | 9/1999 | Anubolu et al. ............... 710/10 |
| 7,058,811 | B2 | * | 6/2006 | Spain et al. .................. 713/176 |
| 7,237,101 | B1 | * | 6/2007 | Dono et al. ..................... 713/1 |
| 2002/0133694 | A1 | * | 9/2002 | Ray et al. ....................... 713/1 |
| 2005/0038981 | A1 | * | 2/2005 | Connor et al. .................. 713/1 |
| 2006/0155978 | A1 | * | 7/2006 | David et al. .................... 713/2 |

* cited by examiner

*Primary Examiner*—Alan Chen
(74) *Attorney, Agent, or Firm*—Law Office of Michael R. Nichols

(57) ABSTRACT

A method and system whereby new devices may be introduced for use with a particular device driver without necessitating a change to the device driver binary is disclosed. In a preferred embodiment of the present invention, an option ROM is provided within the hardware device. Program code contained in the option ROM executes during the system boot process and reads the vendor ID, device ID, subsystem vendor ID, and subsystem device ID from the device. This option ROM code then determines, based on the vendor ID, device ID, subsystem vendor ID, and subsystem device ID, whether to write a signature to a scratch pad register of the device. When the operating system is booted, the driver reads the signature written by the option ROM code. If the signature matches the signature programmed into the driver, the driver claims the device as its own and continues to load.

15 Claims, 5 Drawing Sheets

METHOD AND SYSTEM FOR ENFORCING HARDWARE/SOFTWARE COMPATIBILITY CONSTRAINTS

CROSS-REFERENCE TO RELATED APPLICATIONS

The present application is related to a commonly-owned, co-pending U.S. patent application Ser. No. 10/709,967, filed Jun. 9, 2004, which is incorporated herein by reference.

TECHNICAL FIELD

The present invention is directed generally toward a method and apparatus for preventing undesired combinations of hardware devices and device drivers in combined hardware/software systems.

DESCRIPTION OF RELATED ART

In a typical computer system, a software package known as an "operating system" acts as an intermediary between software applications and the underlying hardware platform. Most modern operating systems follow a modular design that allows the operating system to work with a number of different possible hardware configurations. In this modular scheme, each hardware device is associated with a software component known as a device driver. The device driver contains program code that acts as a translator between the low-level interface of its associated hardware device and the high-level interface of the operating system at large.

Device drivers are written so that a new device driver may be installed for use by the operating system when the hardware device is first installed on the machine. Manufacturers of hardware devices typically distribute their devices along with device drivers for installation on the user's system. By being able to install a new device driver along with a given software component, a user avoids having to install a new operating system every time a new device is installed (or un-installed) on the machine. The user simply installs a new device driver component, which can be loaded and used by the existing operating system without modifying the operating system itself.

In a typical operating system, device drivers are loaded at boot-time. That is, when the computer is first started (booted) and the operating system is initially loaded, the operating system detects which hardware devices are installed in the system, loads device drivers corresponding to those devices, and activates those device drivers to allow the operating system to interact with the installed hardware devices.

In modern hardware interface specifications, such as the Peripheral Component Interconnect (PCI) bus architecture, the hardware devices themselves contain some degree of identifying information to allow an operating system, a device driver, or other software to determine which devices are installed in the computer system. In the PCI standard, for example, each device contains a vendor identification number (vendor ID), a device identification number (device ID), a subsystem vendor ID, and a subsystem device ID, which together uniquely identify a particular device. The subsystem IDs can be used to designate different variations on a particular device, such as whether the device (at least as purchased) supports certain features or not. At boot time, a device driver installed for the device can check the vendor IDs and device IDs against a list of compatible devices' vendor and device ID's to determine whether the device driver should be loaded for the device.

It has become a common practice in the computing industry for operating system vendors to test and certify (qualify) third-party device drivers for compatibility. Once a device driver has been tested and certified as compatible, the operating system vendor digitally signs the device driver. This digital signing authenticates the operating system vendor's finding the device driver compatible with the operating system.

This digital signing of certified device drivers can be problematic for hardware vendors, however. Oftentimes, a hardware vendor will release a new product that is compatible with an existing device driver in all respects except that the new product will have a new set of vendor IDs and device IDs. This requires that the device driver be modified to check for the new vendor and device IDs, a relatively minor change. The problem with this approach, however, is that any change to the device driver necessitates that the driver be re-tested and re-certified by the operating system vendor, which requires the hardware vendor to expend additional time and money prior to release of the new driver/device.

One particular strategy that has been employed to avoid having to modify the device driver to include new devices is for the device driver to check only the main vendor and device IDs (i.e., skip checking the subsystem vendor and device IDs). This way, different variations on a given device may be supported by the device driver without the device driver having to be reprogrammed to include each new device. This solution, however, is disadvantageous in that it violates the driver signing process and poses a significant security threat. Specifically, when only the main vendor and device IDs are checked, it makes it possible for a user to utilize a combination of device and device driver that the user has not paid for (since the device driver is not able to determine with certainty which device it is being used to interface with).

Thus, it would be desirable to relieve the burden on a hardware vendor of re-certifying or re-qualifying a device driver each time a new device that is compatible with the driver is introduced, while avoiding a security compromise. The present invention provides a solution to this and other problems, and offers other advantages over previous solutions.

SUMMARY OF THE INVENTION

Accordingly, the present invention provides a method and system whereby new devices may be introduced for use with a particular device driver without necessitating a change to the device driver binary, which would necessitate re-qualification of the device driver by an operating system vendor. In a preferred embodiment of the present invention, an option ROM is provided within the hardware device. Program code contained in the option ROM executes during the system boot process and reads the vendor ID, device ID, subsystem vendor ID, and subsystem device ID from the device. This option ROM code then determines, based on the vendor ID, device ID, subsystem vendor ID, and subsystem device ID, whether the device should be claimed by the device driver or not. If the option ROM code decides that the device should be claimed, the option ROM code writes a signature to a scratch pad register of the device. The signature determines whether a particular driver should load or not.

When the operating system is booted, the device driver for the device is given an opportunity to load. At this time, the driver reads the signature written by the option ROM code. If the signature matches the signature programmed into the driver, the driver claims the device as its own and continues to load.

In this scheme, vendor and device ID checking is only performed at one level of the boot process by the option ROM code and the result is then communicated to the driver. This reduces the burden of the device driver to store a list of compatible vendor and device IDs, while still maintaining full security. Because no changes need be made to the device driver to accommodate newly released devices, the need for re-qualification of the device driver binary is obviated. This reduces hardware development time and cost.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
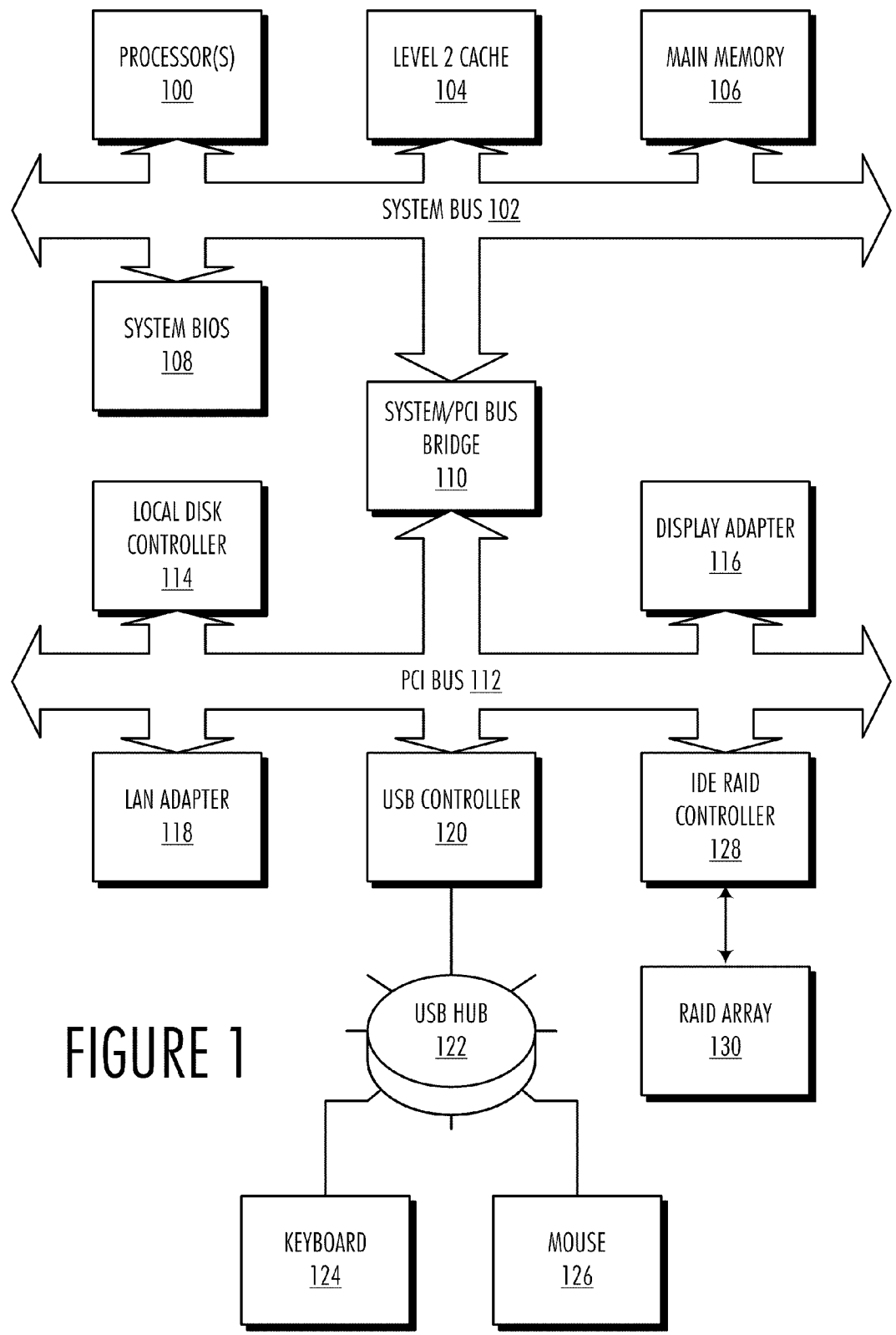
FIG. 1 is a block diagram of a computer system in which a preferred embodiment of the present invention may be implemented.

A preferred embodiment of the present invention provides an apparatus, computer program product, and method for enforcing software/hardware compatibility constraints in a software-based RAID (Redundant Array of Inexpensive Disks) storage system associated with a host computer system. FIG. 1 is a block diagram of a computer system in which a preferred embodiment of the present invention may be implemented.

One or more processors 100 are coupled to a system bus 102, which connects processor(s) 100 to various memory components. Main memory 106, comprising Random Access Memory (RAM), represents the bulk of primary memory storage available to processor(s) 100. A level 2 cache memory 104, which is smaller than main memory 106 but constructed using faster memory components than main memory 106, is a temporary intermediate storage area that allows processor(s) 100 to operate at a higher speed than would otherwise be possible with only main memory 106. System BIOS 108, a non-volatile memory, contains system firmware for loading an operating system at system startup and for performing various other low-level functions. BIOS is an acronym for "Basic Input/Output System." For performance purposes, it is common for processor(s) 100 to copy the contents of BIOS 108 into main memory 106 for faster access, as RAM generally allows faster access than non-volatile memories; this copying is referred to as "shadowing."

Typically, system bus 102 will follow a proprietary specification associated with processor(s) 100. While this arrangement is acceptable for interfacing processor(s) 100 to memory, because it provides for maximum performance, the proprietary nature of most microprocessor bus signal specifications seriously limits the ability of system buses like bus 102 to interface with off-the-shelf peripheral devices. For that reason, it is customary in computer design to include one or more backplane buses following a standard bus specification, to allow third-party peripheral devices to be connected to the computer system. In FIG. 1, a bus 112 following the Peripheral Component Interconnect (PCI) industry standard is provided for the connection of various peripherals. A system/PC bus bridge 110 connects system bus 102 to PCI bus 112 and translates bus signals between the two buses.

A number of peripheral devices are shown connected to PCI bus 112. One of ordinary skill in the art will recognize that any of a great number of different kinds of devices may be connected to such a bus and that the devices described here as connected to bus 112 are intended to be merely examples. A local disk controller 114 allows data to be read or written to a locally-attached disk device such as a fixed-disk drive or a removable-disk drive. A display adapter 116 provides an interface between PCI bus 112 and a display device, such as a cathode-ray tube (CRT), liquid crystal display (LCD), or plasma display device. Local area network (LAN) adapter 118 connects PCI bus 112 to an Ethernet, 802.11 wireless network, or other form of local area network infrastructure.

Universal Serial Bus (USB) controller 120 provides an interface between PCI bus 112 and USB hub 122, to which peripheral devices conforming with the USB interface standard may be attached. USB devices are generally "hot-swappable," meaning that they may be safely added or removed from the system while the system is turned on. USB devices are typically used in applications where a removable or external device is desirable, such as in the case of human input devices. For example, in the computer system depicted in FIG. 1, USB keyboard 124 and USB mouse 126 are shown connected to USB hub 122.

As a preferred embodiment of the present invention is intended to be implemented in the context of a software-controlled RAID array, a RAID array controller card 128 (which may also be referred to as an "adapter card" or "adapter") is shown coupled to PCI bus 112. In this preferred embodiment, controller card 128 is a host bus adapter (HBA) that interfaces PCI bus 112 with an array of storage devices 130 (typically fixed magnetic disk drives) complying with the IDE (Integrated Drive Electronics) standard for storage device interfaces.

Figure 2:
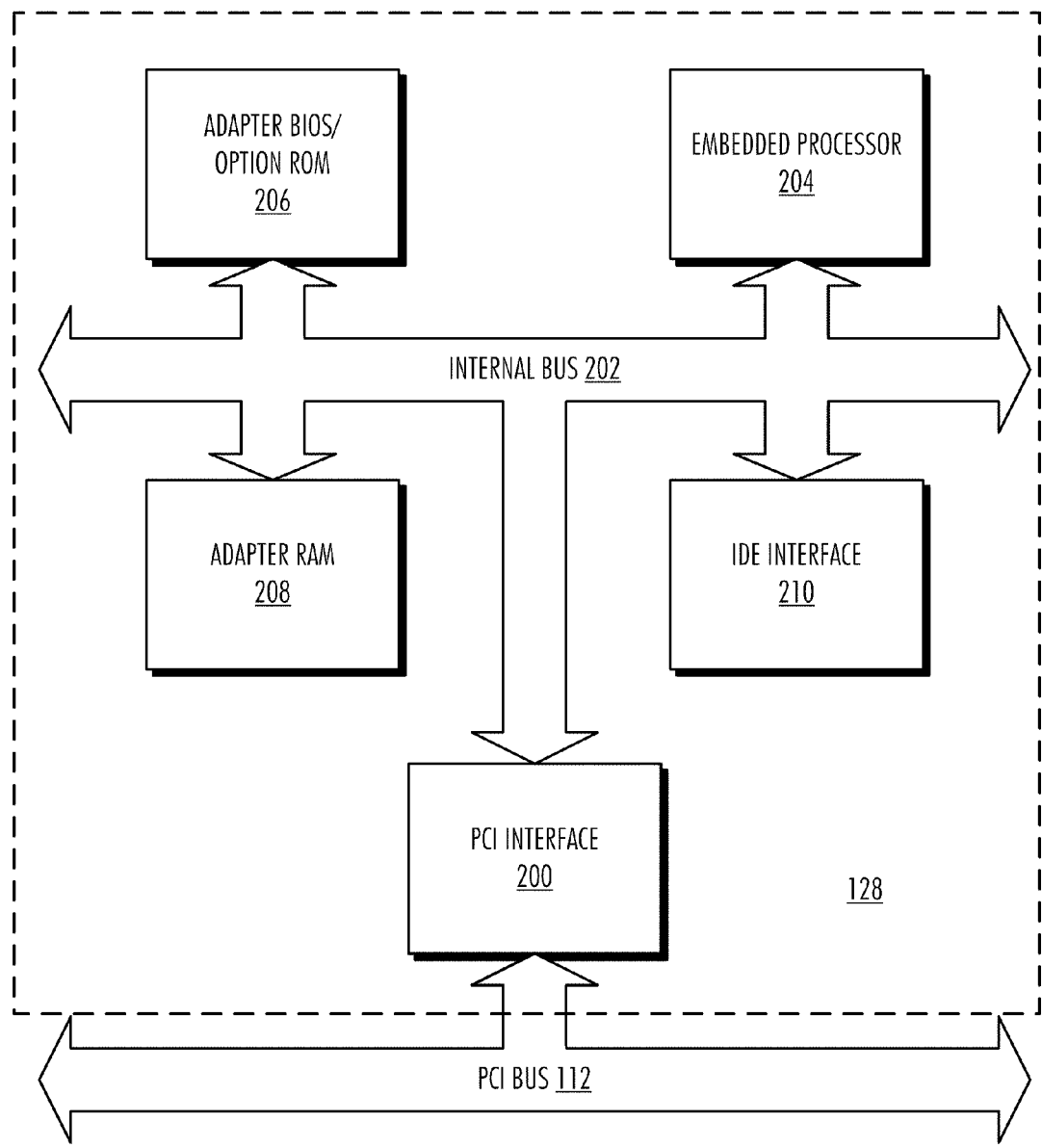
FIG. 2 is a block diagram of a storage device controller in which a preferred embodiment of the present invention may be implemented.

FIG. 2 is a diagram providing a more detailed view of the inner architecture of controller card 128 in accordance with a preferred embodiment of the present invention. One of ordinary skill in the art will recognize that many, if not all, of the components described in FIG. 2 may be embodied within a single monolithic integrated circuit (i.e., as a "system-on-a-chip," more commonly abbreviated as "SoC").

PCI interface circuitry 200 acts as a bridge between PCI bus 112 and controller 128's internal bus 202. An embedded processor 204 is coupled to internal bus 202 and controls the operation of controller 128 according to firmware contained in adapter BIOS/option ROM 206, a non-volatile memory (typically flash memory or some other electrically re-programmable non-volatile memory). At boot-time, the host computer system scans for option ROMs, such as option ROM 206, and executes option ROM code stored in the option ROMs for the purpose of initializing the various PCI-based peripherals attached to the host computer system. Adapter RAM 208 provides volatile storage space in the form of a plurality of scratchpad registers for storing state information. These scratchpad registers may be read from PCI bus 112 through PCI interface 200, to allow a host computer to read the state of controller 128. IDE interface 210 provides an IDE-compliant interface for communicating with the attached IDE-compliant storage devices comprising the RAID array.

A preferred embodiment of the present invention provides software/hardware compatibility constraint enforcement to a software-defined RAID system. In a software-defined RAID system, all of the logic required to implement the particular RAID storage scheme or RAID level desired is provided by software that executes on the host computer system. As a consequence, in such a system, host software has full access to the controller hardware, including internal registers (adapter RAM 208), which form a part of controller 128's PCI configuration space (see FIG. 3 and accompanying text for a description of the PCI configuration space). Because of this level of control, these registers can be used as a means of communication between different software components.

In a preferred embodiment of the present invention, a designated 32-bit register in adapter RAM 208 (the "scratchpad" register) is used to store a signature that denotes which device driver(s) may be utilized in conjunction with controller 128. Firmware contained in adapter BIOS/option ROM 206 is responsible for filling this register with an appropriate signature upon initialization of controller 128 (as described in FIG. 4 and accompanying text). In this preferred embodiment, a device driver for controller 128 will be loaded by the host only if an appropriate signature is found (see FIG. 5 and accompanying text).

Figure 3:
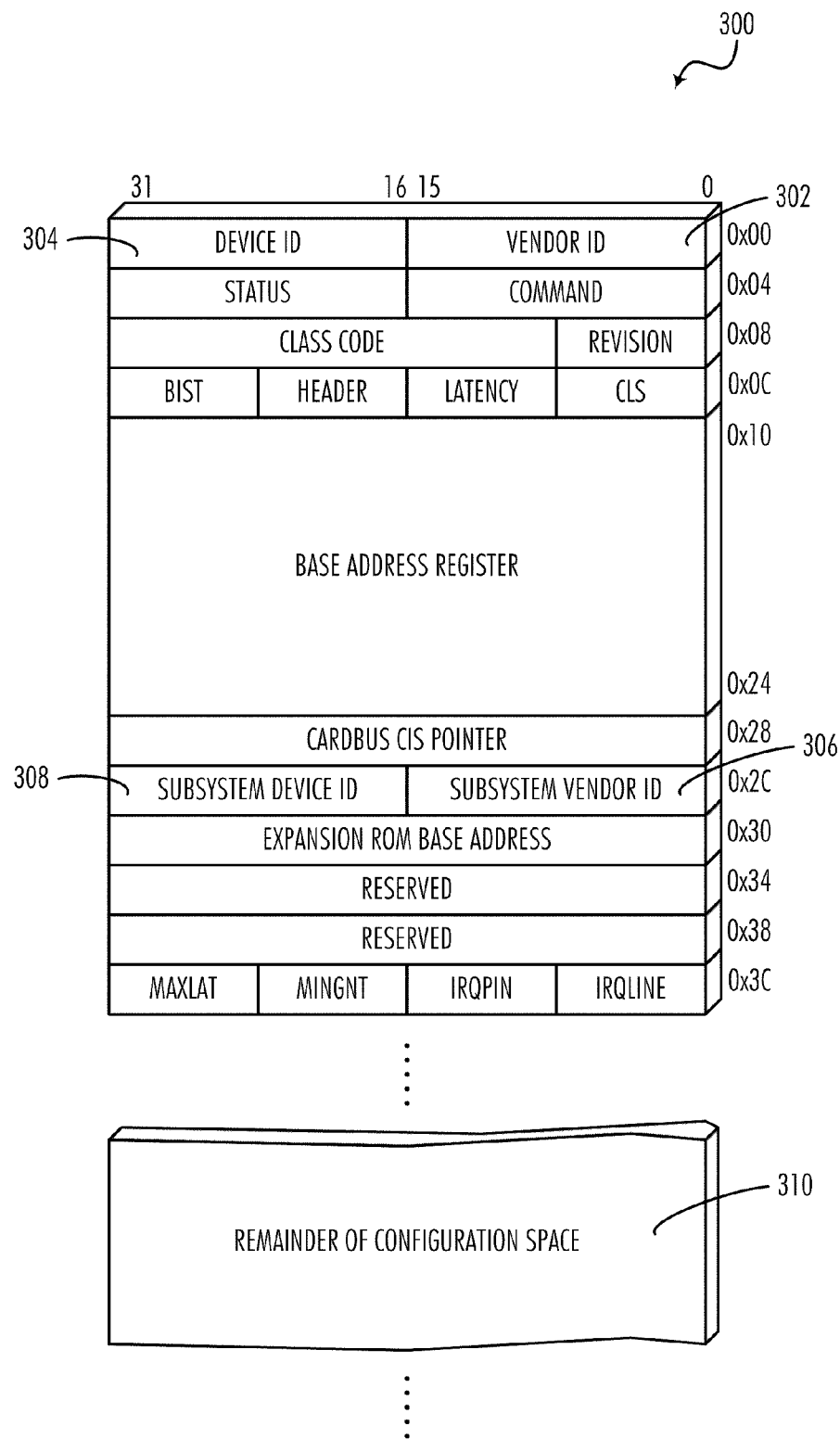
FIG. 3 is a diagram of a PCI configuration space utilized in a preferred embodiment of the present invention.

FIG. 3 is a diagram representing the contents of the PCI configuration space of a PCI peripheral or adapter (such as controller 128 in FIGS. 1-2). The PCI specification allows for 256 bytes of configuration space. The first 64 bytes of the configuration space are reserved as a header 300. The remaining 192 bytes (remainder 310) are available for a hardware vendor's arbitrary use.

The diagram in FIG. 3 illustrates the various fields in header 300 in the form of 32-bit words in little-endian format. As shown in FIG. 3, a PCI device is uniquely defined by four 16-bit identification numbers, a vendor identification number 302 (vendor ID), device identification number 304 (device ID), a subsystem vendor ID 306, and a subsystem device ID 308). In a preferred embodiment of the present invention, code within option ROM 206 (FIG. 2) reads identification numbers 302, 304, 306, and 308 and, in response, writes a 64-byte signature to a designated location in remainder 310 of the configuration space. The precise location within remainder 310 of the signature, as well as the contents of the signature may be chosen arbitrarily by the hardware vendor. A corresponding device driver, when in the process of being loaded by the operating system, reads the signature to determine whether to continue loading the driver. This process is more specifically described in FIGS. 4 and 5.

Figure 4:
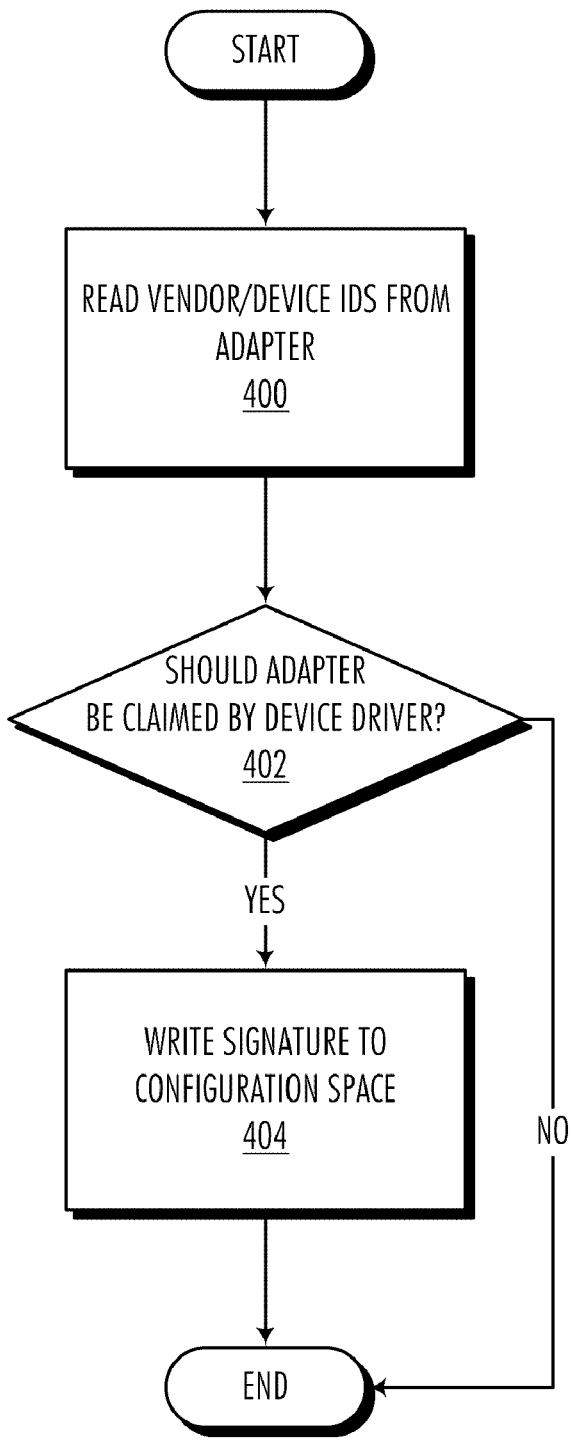
FIG. 4 is a flowchart representation of a process taken by option ROM code to write a signature to configuration space in a preferred embodiment of the present invention.

FIG. 4 is a flowchart representation of a process taken by option ROM code to write a signature to configuration space in a preferred embodiment of the present invention. The process described in FIG. 4 is executed during the system boot process. When the computer system (FIG. 1) is first booted, processor 100 (one processor is assumed for this example) executes system BIOS 108, which causes the peripherals attached to PCI bus 112 (e.g., IDE RAID Controller 128, LAN adapter 118, etc.) to be scanned for the existence of option ROMs containing initialization code, such as option ROM 206 of IDE RAID controller 128 (FIG. 2). This initialization code is executed as part of the boot process. The process depicted in FIG. 4 is executed as part of the initialization code within option ROM 206 that is executed during this boot-time initialization.

Turning now to the specific details of FIG. 4, the option ROM code first reads the vendor and device IDs (identification numbers 302, 304, 306, and 308 in FIG. 3) from the adapter's configuration space (block 400). Next, the option ROM code determines, based on these identification numbers, whether the adapter should be "claimed" by a particular device driver during operating system startup (block 402). When an adapter is "claimed" by a device driver, the operating system loads the device driver and assigns the device driver to handle input/output corresponding to that adapter. If the adapter should be claimed by the particular device driver in question (block 402:Yes), then a corresponding signature is written to a designated location in the adapter's configuration space, where it can be retrieved during the device driver loading process (block 404) and the process terminates. Otherwise (block 402:No), the process simply terminates.

Figure 5:
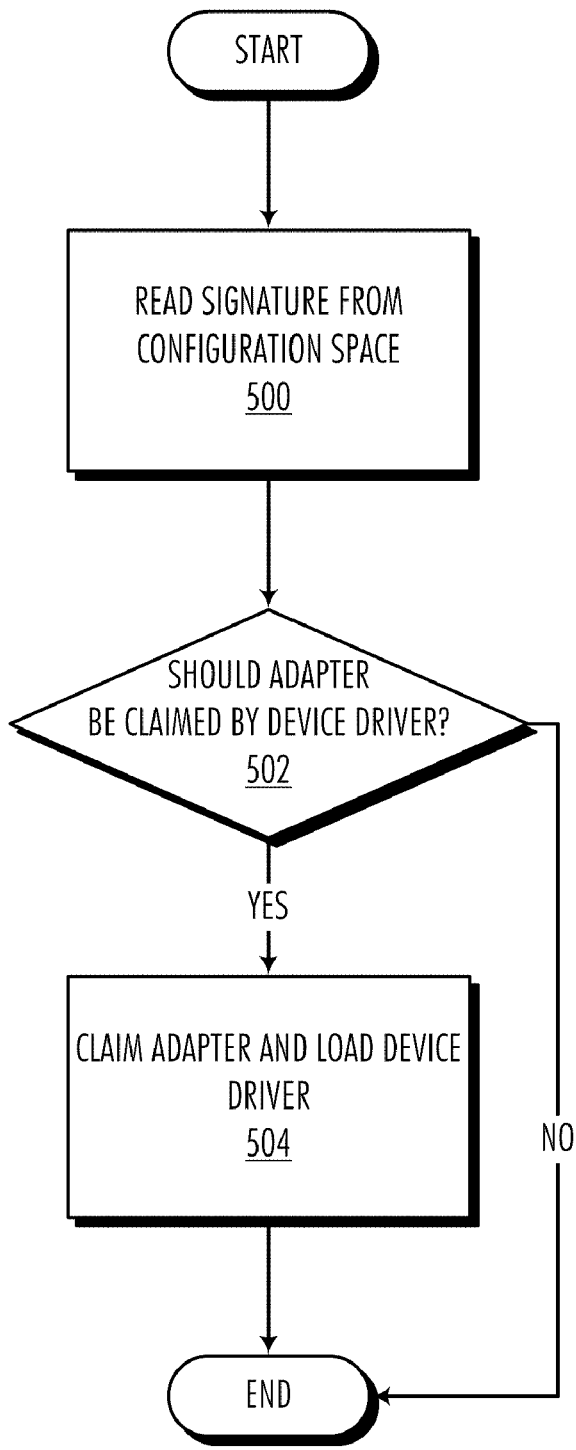
FIG. 5 is a flowchart representation of a process taken by device driver code to determine whether to complete the loading of the device driver in a preferred embodiment of the present invention.

After system BIOS 108 (FIG. 1) completes its execution of option ROM code, the next task system BIOS 108 must perform is to load the computer system's operating system kernel from secondary storage, such as a disk drive. The operating system kernel, once loaded, has the task of loading and initializing device drivers for interfacing with the various peripherals in the system. In a preferred embodiment of the present invention, the operating system kernel will attempt to load a device driver corresponding to controller 128. During this process, the operating system kernel will execute initialization code within the device driver. This initialization code determines whether to complete the loading of the device driver. FIG. 5 is a flowchart representation of a process taken by this initialization code to determine whether to complete the loading of the device driver.

Turning now to the specifics of FIG. 5, the designated signature location within the adapter's configuration space is read (block 500). Next, a determination is made as to whether the signature read from the configuration space denotes that the adapter should be claimed by the present device driver (block 502), by matching a pre-defined signature associated with the device driver, for example. If so (block 502:Yes), the adapter is claimed by the device driver and the remainder of device driver initialization and loading is completed. Otherwise (block 502:No), the process terminates without the device driver's having been loaded.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-implemented method comprising:
    executing boot-time code stored in a non-volatile store embedded within a peripheral device, wherein executing the boot-time code includes actions of:
        reading identification numbers from the peripheral device;
        determining, from the identification numbers, if the peripheral device may be used with a particular device driver; and
        in response to a determination that the peripheral device may be used with a particular device driver, writing a signature to a scratchpad register in a configuration space of the peripheral device.

2. The method of claim 1, wherein the identification numbers include a vendor identification number and a device identification number.

3. The method of claim 2, wherein the identification numbers include a subsystem vendor identification number and a subsystem device identification number.

4. The method of claim 1, further comprising:
    executing device driver code associated with the particular device driver, wherein executing the device driver code includes actions of:
        determining whether the signature has been written to the configuration space; and
        in response to a determination that the signature has been written to the configuration space, enabling the device driver.

5. A computer program product comprising:
    a first tangible computer-readable storage medium containing first functional descriptive material that, when executed by a computer, directs the computer to perform actions that include:
        reading identification numbers from the peripheral device;
        determining, from the identification numbers, if the peripheral device may be used with a particular device driver; and
        in response to a determination that the peripheral device may be used with a particular device driver, writing a signature to a scratchpad register in a configuration space of the peripheral device.

6. The computer program product of claim 5, wherein the identification numbers include a vendor identification number and a device identification number.

7. The computer program product of claim 6, wherein the identification numbers include a subsystem vendor identification number and a subsystem device identification number.

8. The computer program product of claim 5, wherein the first computer-readable medium is a non-volatile store associated with the peripheral device.

9. The computer program product of claim 5, further comprising:
    a second tangible computer-readable storage medium containing second functional descriptive material associated with a device driver, wherein the computer's executing the second functional descriptive material directs the computer to perform actions that include:
        determining whether the signature has been written to the configuration space; and
        in response to a determination that the signature has been written to the configuration space, enabling the device driver.

10. A peripheral device comprising:
    at least one non-volatile store;
    an interface adapted to provide connectivity between the at least one non-volatile store and a computer system; and
    a set of instructions within the at least one non-volatile store, wherein the set of instructions are adapted to be executed by the computer system so as to direct the computer system to perform actions that include:
        reading identification numbers from the peripheral device;
        determining, from the identification numbers, if the peripheral device may be used with a particular device driver; and
        in response to a determination that the peripheral device may be used with a particular device driver, writing a signature to a scratchpad register in a configuration space of the peripheral device.

11. The peripheral device of claim 10, wherein the identification numbers include a vendor identification number and a device identification number.

12. The peripheral device of claim 11, wherein the identification numbers include a subsystem vendor identification number and a subsystem device identification number.

13. A data processing system comprising:
    at least one processor;
    at least one memory;
    a peripheral device having a non-volatile store;
    a first set of instructions in the non-volatile store, wherein the at least one processor executes the first set of instructions to perform actions of:
        reading identification numbers from the peripheral device;
        determining, from the identification numbers, if the peripheral device may be used with a particular device driver; and
        in response to a determination that the peripheral device may be used with a particular device driver, writing a signature to a scratchpad register in a configuration space of the peripheral device;

a second set of instructions in the at least one memory, wherein the at least one processor executes the second set of instructions to perform actions of:
  determining whether the signature has been written to the configuration space; and
  in response to a determination that the signature has been written to the configuration space, enabling the device driver.

14. The data processing system of claim 13, wherein the identification numbers include a vendor identification number and a device identification number.

15. The data processing system of claim 14, wherein the identification numbers include a subsystem vendor identification number and a subsystem device identification number.

* * * * *